US008826249B2

(12) United States Patent
Dice et al.

(10) Patent No.: US 8,826,249 B2
(45) Date of Patent: Sep. 2, 2014

(54) METHOD AND SYSTEM FOR OPTIMIZING CODE FOR A MULTI-THREADED APPLICATION

(75) Inventors: David Dice, Foxboro, MA (US); Virendra J. Marathe, Florence, MA (US); Mark S. Moir, Windham, NH (US)

(73) Assignee: Oracle International Corporation, Redwood Shores, CA (US)

( * ) Notice: Subject to any disclaimer, the term of this patent is extended or adjusted under 35 U.S.C. 154(b) by 881 days.

(21) Appl. No.: 12/708,014

(22) Filed: Feb. 18, 2010

(65) Prior Publication Data

US 2011/0202907 A1 Aug. 18, 2011

(51) Int. Cl.
*G06F 9/45* (2006.01)
*G06F 9/455* (2006.01)

(52) U.S. Cl.
CPC ............ *G06F 9/45516* (2013.01); *G06F 8/456* (2013.01)
USPC ............................ 717/148; 717/151; 717/154

(58) Field of Classification Search
CPC .................................................. G06F 9/45516
USPC .................................................. 717/140–167
See application file for complete search history.

(56) References Cited

U.S. PATENT DOCUMENTS

| | | | |
|---|---|---|---|
| 2003/0005180 A1* | 1/2003 | Schmit et al. ................. | 709/328 |
| 2007/0169002 A1* | 7/2007 | Kronlund et al. ............ | 717/130 |
| 2007/0226683 A1* | 9/2007 | Stoodley et al. .............. | 717/106 |
| 2008/0101232 A1* | 5/2008 | Archer et al. ................. | 370/235 |
| 2008/0127134 A1* | 5/2008 | Tirumalai et al. ............ | 717/140 |
| 2009/0276758 A1* | 11/2009 | Song et al. .................... | 717/124 |
| 2010/0050161 A1* | 2/2010 | Nir-Buchbinder et al. ... | 717/126 |
| 2010/0281471 A1* | 11/2010 | Liao et al. ..................... | 717/141 |

OTHER PUBLICATIONS

Luk, Chi-Keung, et al. "Pin: building customized program analysis tools with dynamic instrumentation." Acm Sigplan Notices. vol. 40. No. 6. ACM, 2005, pp. 190-200.*
Chen, Wen-Ke, et al. "Mojo: A dynamic optimization system." 3rd ACM Workshop on Feedback-Directed and Dynamic Optimization (FDDO-3). 2000, pp. 1-10.*
Bogda, Jeff, and Urs Hölzle. "Removing unnecessary synchronization in Java." ACM SIGPLAN Notices. vol. 34. No. 10. ACM, 1999, pp. 35-46.*

* cited by examiner

*Primary Examiner* — Satish Rampuria
(74) *Attorney, Agent, or Firm* — Park, Vaughan, Fleming & Dowler LLP

(57) ABSTRACT

In modern multi-threaded environments, threads often work cooperatively toward providing collective or aggregate throughput for an application as a whole. Optimizing in the small for "thread local" common path latency is often but not always the best approach for a concurrent system composed of multiple cooperating threads. Some embodiments provide a technique for augmenting traditional code emission with thread-aware policies and optimization strategies for a multi-threaded application. During operation, the system obtains information about resource contention between executing threads of the multi-threaded application. The system analyzes the resource contention information to identify regions of the code to be optimized. The system recompiles these identified regions to produce optimized code, which is then stored for subsequent execution.

13 Claims, 5 Drawing Sheets

METHOD AND SYSTEM FOR OPTIMIZING CODE FOR A MULTI-THREADED APPLICATION

BACKGROUND

1. Field

The present embodiments relate to code optimizations that increase the performance of application software. More specifically, the present embodiments relate to techniques for dynamically optimizing code to increase the aggregate throughput of a multi-threaded application in a highly concurrent environment.

2. Related Art

Typical just-in-time (JIT) compilers, as might be found in a modern Java™ Virtual Machine, or JVM™ (Java™ and JVM™ are trademarks of Sun Microsystems, Inc.) or other managed runtime environments, optimize emitted code only for single-threaded execution, even though the emitted code might ultimately execute in a highly concurrent environment. Most optimization strategies focus on improving the latency of individual threads and the size of code. In fact, traditional static compilers and JIT compilers are typically thread-oblivious and compile code with the singular goal of shortening the path length, that is, the path executed by a single thread. For example, JIT compilers apply feedback-directed optimization which involves: compiling the code to apply well-known static optimization techniques; profiling subsequent execution of the code to identify "hot" paths where optimization can be most profitably applied; and recompiling the code to minimize the length of the hot paths.

In modern multi-threaded environments, however, threads often work cooperatively toward providing a higher collective or aggregate throughput for an application as a whole. Optimizing in the small for "thread local" common path latency, however, is often (but not always) the best approach for a concurrent system composed of multiple cooperating threads. As the industry continues to move toward multi-core computing, optimizing for throughput will become increasingly important.

Hence, what are needed are techniques for directing a compiler to augment traditional code emission with thread-aware policies and optimization strategies to increase the aggregate throughput of multi-threaded applications.

SUMMARY

The present embodiments provide a system for optimizing code in a multi-threaded application to increase aggregate throughput in a highly concurrent environment. During operation, the system obtains information about resource contention between executing threads of the multi-threaded application. Then the system analyzes the resource contention information to identify regions of the code to be optimized. Finally, the system recompiles these identified regions to produce optimized code, which is then stored for subsequent execution.

In some embodiments, acquiring the resource contention information involves identifying those contended lock sites associated with critical sections in the code.

In some embodiments, acquiring the information associated with the resource contention information involves: statically analyzing the code; sampling CPU performance; analyzing programmer-provided hints; identifying operating system resource consumption bottlenecks; or providing information about program behavior statistics from the garbage collector.

In some embodiments, the optimization techniques, which are described in terms of dynamic compilation, are broadly applicable to static compilation, particularly those techniques that employ feedback-directed optimization.

In some embodiments, although the optimization techniques are motivated by simple mutual exclusion locks, the techniques are generally applicable to other synchronization primitives.

In some embodiments, producing the optimized code further involves one or more of the following operations: inlining one or more paths within the critical section; de-coarsening the critical section; recompiling an inline lock acquisition path without biased locking admission code; hoisting code out of the critical section; optimistically shifting computation out of the critical section; and deferring involuntary preemption for threads executing in the critical section by the operating system kernel.

In some embodiments, the runtime environment receives the acquired resource contention information and sends this information to the compiler through one or more interfaces.

In some embodiments, the one or more interfaces for the compiler are extended to permit subsystems in the runtime environment to recommend compilation policies to the compiler.

In some embodiments, the optimized code is executed in a virtual machine.

In some embodiments, the virtual machine is a Java™ Virtual Machine.

In some embodiments, the compiler is a just-in-time compiler, which compiles byte codes into native machine code on the fly.

BRIEF DESCRIPTION OF THE FIGURES

In the figures, like reference numerals refer to the same figure elements. Moreover, multiple instances of the same type of part may be designated by a common prefix separated from an instance number by a dash.

DETAILED DESCRIPTION

Figure 1:
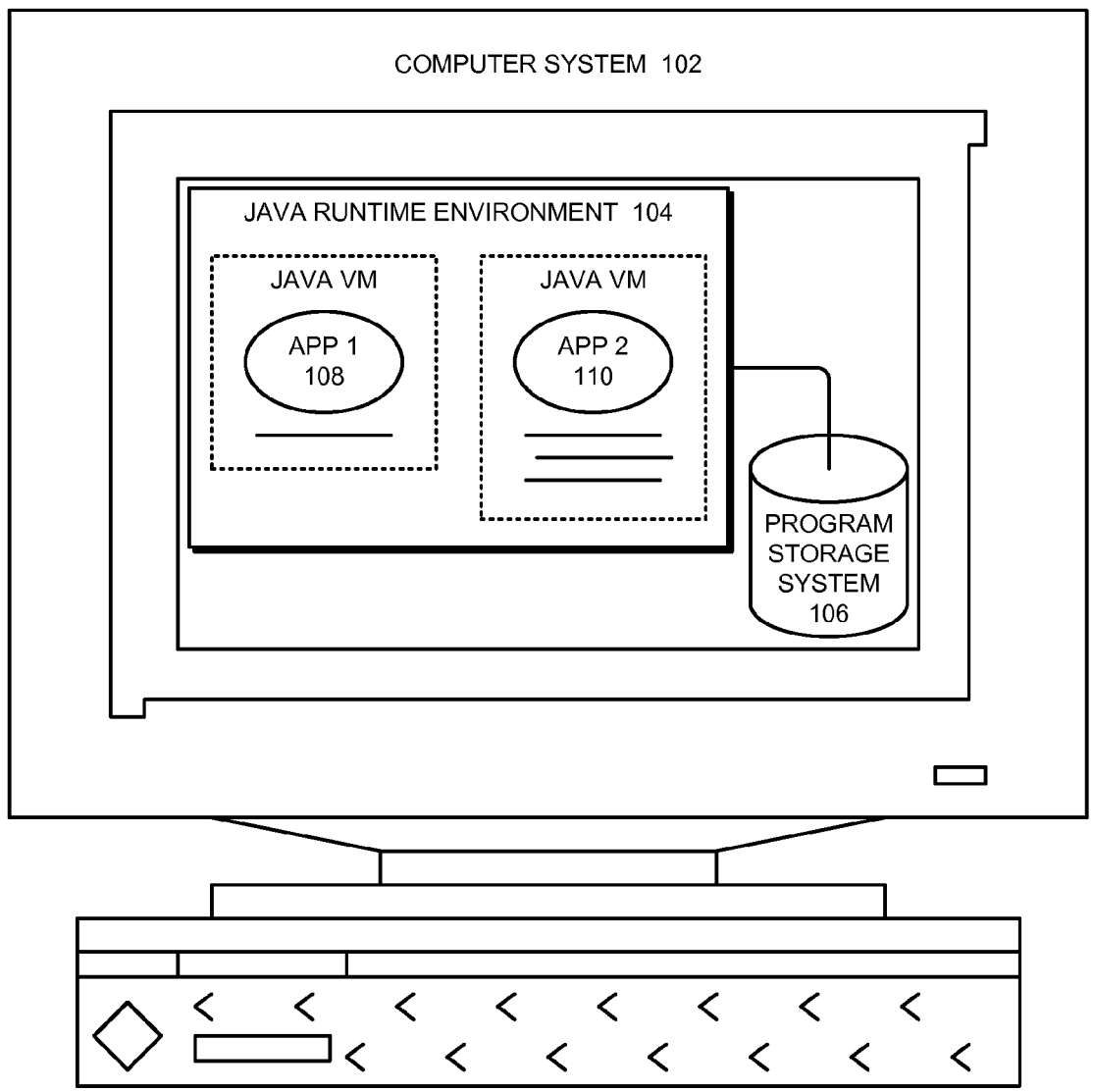
FIG. 1 shows a computer system for a Java™ runtime environment where a single-threaded application and a multi-threaded application execute in their respective Java™ virtual machines, in accordance with an embodiment.

The following description is presented to enable any person skilled in the art to make and use the present embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present embodiments. Thus, the present embodiments are not limited to the embodiments shown, but are to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium. Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

Embodiments provide a method and system for directing a compiler to optimize some part of a software application. More specifically, embodiments provide a method and system for directing a compiler to optimize multi-threaded applications with the goal of improving the application's overall throughput.

A typical application program written in the Java™ programming language is compiled into an intermediate language called "Java™ byte code," a standardized portable binary format. Java™ programs are referred to as "compile once, run anywhere" programs because once compiled into byte code, that byte code can be executed on many different computer platforms. To make "run anywhere" possible, the compiled byte code for a program executes in a Java™ Virtual Machine. The JVM™ simulates a runtime environment in a real machine by emulating the JVM™ instruction set, and the emulation interprets the Java™ byte codes for the program on-the-fly to perform the requested actions. The JVM™, which is available on many hardware and software platforms, is the crucial component of the Java™ platform and is the reason why a Java™ program is portable across many platforms and operating systems.

FIG. 1 shows a computer system in accordance with an embodiment of the present invention. This system includes a program storage system 106 for storing application programs (and their compiled counterparts) and a computer system 102 that executes the byte codes of Java™ application programs. Both the Java™ program source code and the compiled Java™.class or .jar byte code files for the program are stored in the program storage system 106.

The computer system illustrated in FIG. 1 shows each Java™ program executing in its own JVM™, which is an instance of the Java™ runtime environment 104. In particular, there are two programs, each representing a common class of Java™ applications. One program, app 1 (108) is a single-threaded application, depicted by the single horizontal line, indicating a single process with one thread of execution. The second program, app 2 (110) is a multi-threaded application, depicted by the three horizontal lines, which indicate three concurrent threads executing in a single process. These examples are not meant to limit the scope of the present invention but serve to illustrate the classes of applications.

Unfortunately, interpreting byte codes hurts performance. Java™ byte code executes in an intermediate layer—the JVM™—between the application and the hardware and operating system. This extra layer entails significant performance overhead. How much performance is lost varies considerably with different applications. So it is desirable to balance the disadvantage of reduced performance with the advantage of portability.

One way to achieve this balance is to replace the interpreted byte code with the native machine code. Typically, the source code for a program is compiled in its entirety, producing the executable code native to the system. In contrast, the compilation of portable byte code to native machine code is done on demand; native machine code is executed thereafter by the Java™ Virtual Machine.

Figure 2:
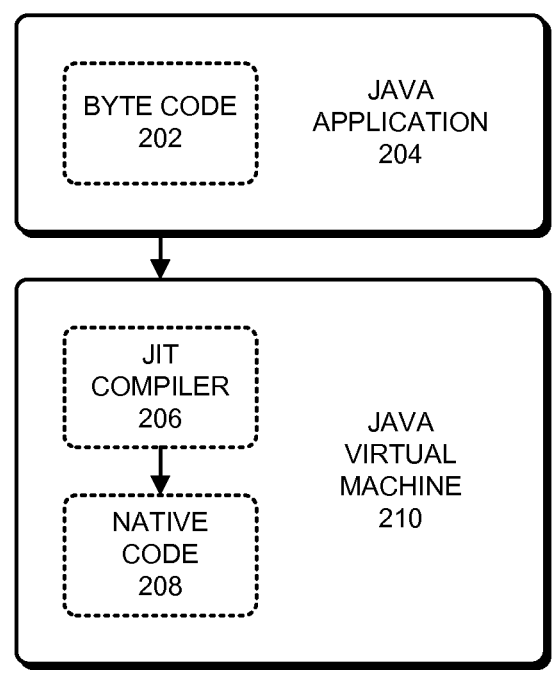
FIG. 2 shows a typical Java™ system in accordance with an embodiment.

Part of the JVM™ is the just-in-time compiler, also called the JIT compiler for short. FIG. 2 shows a typical Java™ system in accordance with one embodiment of the invention: a Java™ application 204, a JIT compiler 206, and a Java™ virtual machine 210. The JIT compiler 206 is a code generator that converts Java™ byte code 202 from Java™ application 204 into native machine code 208 and stores that translated code back into memory. More specifically, when the Java™ virtual machine 210 invokes a Java™ method in a program for the very first time, the JIT compiler 206 compiles the byte code 202 of the method block into native code 208 for this method and stores this translated code into memory. Each subsequent invocation of the Java™ method will execute the native code 208 in memory. The cost of compiling a method to native code 208 at the time of method invocation is amortized over subsequent invocations. One pays the cost of runtime compilation just once.

The JIT compiler 206 of FIG. 2 does not just blithely translate Java™ byte codes into corresponding native code; it also attempts to optimize the native code, much as a C or C++ compiler would employ optimization strategies to increase the runtime performance of an application program written in C or C++. Most compiler optimization techniques focus almost exclusively on code size and single-threaded latency that are not related to multi-threaded performance or throughput—even in a multi-threaded application—in the hopes that improving single-threaded performance will ultimately improve multi-threaded performance. Embodiments of the present invention address the problem of increasing aggregate throughput of a multi-threaded application.

Most JIT compilers attempt to identify hot code paths and then recompile that code path to minimize or reduce the path length. To a lesser degree, JIT compilers also attempt to reduce the CPI (cycles per instruction) of the executed paths. Ideally, a JIT compiler would minimize the product of path length and CPI, which is equivalent to wall-clock time measured in processor cycles. It is often difficult, however, to efficiently obtain accurate and timely CPI information from the platform performance counter infrastructure, so CPI is not always factored into profiling decisions.

As important as it is for JIT compilers to generate efficient code on-the-fly, such on-demand compilation does not come for free: JIT compilers usually operate under a cycle budget and a space budget for compilation, as they compete for computational and space resources with other applications.

A JIT compiler is usually implemented as a distinct schedulable thread or threads. It will often compete for cycles against application threads running code that the JIT compiler has emitted. As such, JIT compilers are usually restricted to a cycle budget for compilation. For example, it would not normally be profitable for a JIT compiler to subject "cold" (infrequently executed) code paths to expensive execution analysis. The cycles spent in analysis would be better spent optimizing hot (frequently executed) paths or expended elsewhere in the system and, in particular, on application threads that are, in a sense, contributing directly toward forward progress. (JIT compilers do not contribute directly to forward progress of an application.)

In addition to a cycle budget, many JIT compilers operate under a space budget and attempt to minimize "emitted code bloat" in order to reduce memory consumption, instruction TLB (ITLB) span of the emitted code, and instruction cache (I-cache) pressure on the emitted code. The latter two concerns impact the execution efficiency of the emitted code. A JIT compiler typically trades off properties such as code bloat and cycle budget for the quality of emitted code.

To understand the challenge of generating efficient code that increases aggregate throughput of a multi-threaded application operating in a concurrent environment, it is useful to analyze what is different about concurrent executing threads.

A single-threaded application is straightforward: it is just a program in execution—a process with a single thread of control. This single thread is the only entity that manipulates data owned by the application and that interacts with the external world. If the thread were to write a huge file to an external storage system, for example, the application would be blocked from receiving input data from a user, say, because that single thread was engaged in writing to the storage system and could not process input, let alone perform any other task.

A multi-threaded application is one way to solve the problem of writing data at the same time as receiving new data, that is, performing concurrent activities in different threads—but it introduces new problems, which are described below. A multi-threaded application typically executes in a single process (address space) on a computer. Within that process one or more threads of execution (one thread of execution defaults to a single-threaded application) can be spawned to perform work. On a single CPU system only one of these threads at a time can execute on the processor; on a multi-processor system with shared memory, each thread could potentially execute on a different processor. In a multi-threaded application, on the other hand, the I/O and computation could overlap so that most threads make forward progress—and thus increase overall throughput. As an example, some threads may be accessing a storage subsystem and are blocked waiting for data transfer, while other threads are performing some computation in memory. Another example is a multi-threaded application that subdivides a problem into largely independent computational units. Each unit executes in its own thread, typically on different processors. Upon completion of all threads, the individual solutions are combined into one. Since all threads are executing truly in parallel on different processors, the total computation time of the application is bounded by the longest running thread; the parallelism of multiple concurrent threads can dramatically increase aggregate throughput.

The advantages of concurrent execution may be offset by new problems that are peculiar to concurrent execution: unrestricted execution of multiple threads can produce unpredictable behavior, and nondeterministic execution can lead to correctness problems. These problems (and a solution) are discussed below.

A multi-threaded application manipulates two kinds of data: data that is private to each thread, and data that is shared by one or more threads. Thread-private data is uninteresting in the context of concurrent threads. But shared data is problematic because of the difficulty of making guarantees about the state of the data when multiple threads are manipulating the data concurrently. Each thread, as it executes in isolation, has certain expectations of the state of the shared data. For example, suppose data item "X" were initialized to 0, and Thread 1 then incremented "X" to 2. Later, if Thread 1 reads "X" (provided the thread has not further written to "X") it expects the value to be 2. But if "X" were shared among multiple threads, any other thread could—unbeknownst to Thread 1—change "X" to some other value if that change occurred before Thread 1 read "X." Such behavior of threads can be confusing and counterintuitive, making programming under such conditions onerous and potentially questionable.

The sections of code in an application that manipulate shared data—whether the code is reading the data or writing the data—are called "critical sections." These critical sections can be "protected" from such concurrent access by ensuring that if one thread is executing code in the critical section, then another thread is forced to wait until the first thread leaves the critical section. In Java™, the semantics of multi-threaded programs is well-defined, including rules for which values may be seen by a read of shared memory that is updated by multiple threads. These semantics are known as the "Java™ programming language memory model." Note that the semantics do not prescribe how a multi-threaded program should be executed, but rather they describe the behaviors that multi-threaded programs are allowed to exhibit.

What is needed is a mechanism that preserves the correct operation of each thread without unduly affecting performance of all threads. The standard mechanism to synchronize concurrent access by multiple threads to shared data is one that enforces serial access. Unfortunately, serializing access can affect throughput and impede scalability, thus losing all the benefits of concurrency.

In Java™, the most basic mechanism for communicating between threads is synchronization, implemented using monitors. Each object in Java™ is associated with a monitor that a thread can lock or unlock. The lock is automatically acquired by the executing thread before entering a synchronized block and automatically released when control exits the synchronized block. Only one thread at a time can hold a lock on the monitor. Any other threads attempting to lock that monitor are blocked until they can obtain the lock on the monitor.

Multiple threads attempting to lock a monitor are said to "contend for the lock," resulting in lock contention—the lock is in high demand. How often that lock is requested and how long it is held once it is acquired often influences the likelihood of contention for the lock. If these factors are small enough, then lock contention does not pose a significant impediment to scalability. But if there is high contention for the lock, threads will be blocked waiting for it, and in extreme cases, processors will sit idle even though lots of work is available.

Modern Java™ Virtual Machines typically use a spin-then-block strategy in response to lock contention. By spinning, a thread can sometimes avoid blocking (voluntary context switching), which often incurs a considerable performance penalty. In lieu of spinning—which does not contribute directly to forward progress of the application, but instead attempts to avoid context switching—the synchronization subsystem might instead recompile the critical section. More specifically, the computation cycles that would otherwise be spent spinning could be directed toward optimizing and recompiling the offending critical section.

Figure 3:
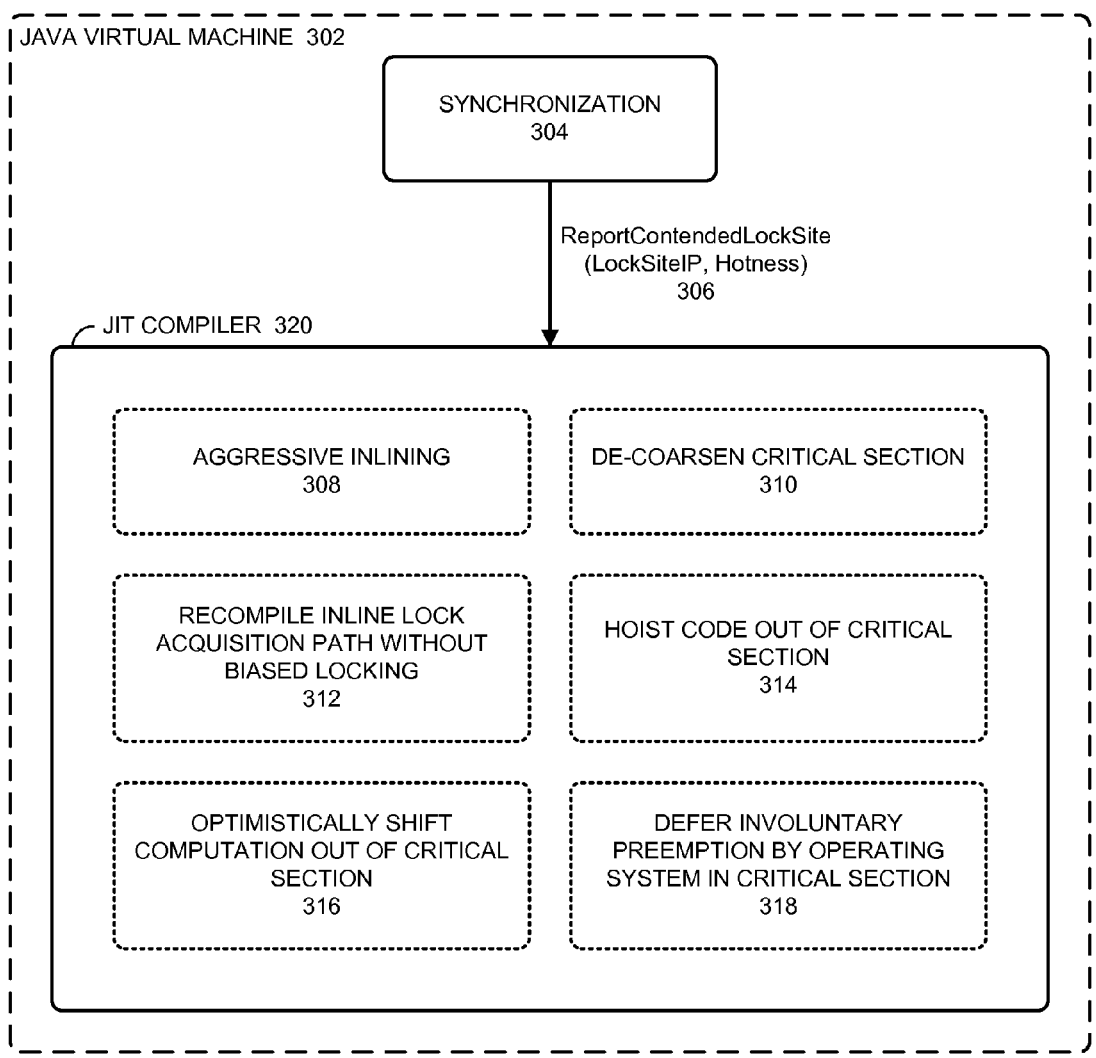
FIG. 3 shows a synchronization subsystem of a Java™ Virtual Machine reporting contended lock sites to a JIT compiler, together with the various optimization techniques the JIT compiler may apply to Java™ applications.

FIG. 3 shows the synchronization subsystem of the Java™ Virtual
Machine in accordance with an embodiment of the invention. In particular, the subsystem captures a set of techniques that optimize for contended critical sections; these optimizations reduce unnecessary lock contention, thereby increasing the aggregate throughput for a multi-threaded application.

The synchronization 304 subsystem is invoked to handle contended locks since information about contention is readily available within the Java™ virtual machine 302. The synchronization 304 subsystem informs the JIT compiler 320 which critical sections were contended. The JIT compiler 320 later dedicates additional compile-time resources toward analyzing and recompiling those critical sections to shorten the frequently taken paths through the critical section, which, in turn, would decrease lock hold times and result in increased aggregate throughput.

If the synchronization 304 subsystem in the Java™ Virtual Machine 302 identifies a contended lock, it reports the lock site to the JIT compiler 320 via an interface such as the following: ReportContendedLockSite(LockSiteIP, Hotness) 306 where LockSiteIP is the virtual address of the lock site previously emitted by the JIT compiler 320, and Hotness is an abstract scalar-valued measure of how contended the critical section is, allowing the JIT compiler 320 to better prioritize its response. Such calls are advisory—the JIT compiler 320 can simply ignore the notification, act on the notification immediately, or schedule the lock site for analysis and possible (re)optimization at a later, more convenient time, for instance when the system might be less busy and JIT compilation activities are less likely to compete with threads actively making "direct" progress. Likewise, note that a 1:1 relationship is presumed for the purpose of explication and to illustrate the invention but recognize that those skilled in the art can devise forms that are not 1:1 and that this approach still applies to those variants. (In some cases these optimizations apply to the locking code itself, and in other cases—the more important ones—they apply to the critical section).

If the JIT compiler 320 ultimately decides to act on the notification, it can recompile the critical section body with various optimizations. In many cases, the optimization strategy as applied to contended critical sections is only an issue of magnitude: optimizations are applied that might be used to improve code latency elsewhere, but increase the priority of applying such optimizations to code in a contended critical section in order to improve throughput, assuming there is some kind of trade-off or balance to be struck. In such cases, the "flavor" or mode of optimization for contended critical sections is the same as is used in other cases, but for contended critical sections it is desirable to apply more optimization effort relative to other paths. In contrast, some embodiments are discussed below which use optimizations that may make single-thread latency worse, while improving overall throughput.

In one embodiment of the system, these optimizations include, but are not limited to, the following: aggressive inlining; de-coarsening the critical section; recompiling the inlined lock acquisition path without biased locking in machine code; applying compilation analysis resources to hoist code out of the critical section; optimistically hoisting some computation out of the critical section; and instructing the operating system kernel to defer involuntary preemption for threads executing in the kernel. Except for the last optimization, the other optimizations share the property of reducing the common case path length through the contended critical sections—that is, they strive to reduce lock hold times, which in turn reduces unnecessary contention. Deferring involuntary preemption can increase throughput by reducing unnecessary contention. These optimizations are discussed in turn with reference to FIG. 3.

Aggressive Inlining

Aggressive inlining 308 in FIG. 3 is an important optimization. In one or more embodiments, the JIT compiler 320 applies more aggressive inlining to paths within the critical section, possibly trading off emitted code size against improved path efficiency. Modern JIT compilers inline aggressively, so it is not uncommon to find that one logical lock site is associated with multiple "physical" emitted lock sites. This is advantageous, allowing the JIT compiler 320 to specialize emitted code based on the behavior and context of a given physical lock site. For instance, it may be the case that only one physical site is contended, so the JIT compiler can tailor the optimizations applied to just that specific context.

Note that in this instance it is useful to apply more of the "usual" classic thread-oblivious optimizations for contended critical sections relative to other regions of code. That is, the mode of optimization is traditional, but the focus is primarily on the code in a contended critical section rather than elsewhere.

Inlining is particularly important for Java™, as an application is often formed from a very large number of class files and tends be very "call heavy." To allow late and dynamic binding, Java™ cannot optimize over class file boundaries, so it is critical for performance that the Java™ Virtual Machine 302 inline aggressively. It is also important on the SPARC architecture because logical call graphs tend to be deep like a "vine" instead of broad like a "bush," so without either aggressive inlining or an alternative calling convention, performance problems can arise from an excessive number of spill-fill traps.

That same inlining is critical to the success of Transactional Lock Elision (TLE) on a multicore processor codenamed ROCK. That is, TLE benefits from aggressive inlining in part because inlining avoids the RESTORE instruction restriction associated with non-leaf procedure calls on the ROCK processors. Excessive or unconstrained inlining, however, can be detrimental to performance as it can increase the size of emitted code (code bloat), so inlining is ideally applied judiciously. For these purposes, the JIT compiler 320 might try to inline aggressively when TLE is enabled or for sites where TLE is more likely to be profitable. In addition, the JIT compiler 320 might optimistically speculate that a site is TLE-worthy and inline the site aggressively. The runtime could then monitor TLE success at the site and, if TLE is not useful, instruct the JIT compiler 320 to recompile the site without such aggressive inlining.

Note that with inlining one logical method or part of a method could be inlined into multiple physical call sites. That is, a single logical lock site might expand and be emitted as multiple physical sites because of aggressive inlining. That, in turn, provides an opportunity for site-specific specialization and refinement.

In one or more embodiments, a commercially available Java™ Virtual Machine can profile execution and recompile, often changing inlining decisions and adjusting code basic blocks so the hot execution path is "fall through" and to the extent possible has no taken branches. Note that a JIT compiler 320 can, in a sense, make "guesses." If the system speculates incorrectly and get some suspected invariant wrong, the JIT compiler 320 can just recompile. Anything is legal as long as the application cannot observe that the JIT compiler 320 "bet" in the wrong direction.

De-coarsening the Critical Section

FIG. 3 shows that a critical section can be de-coarsened 310 as part of the JIT compiler 320. Note that lock coarsening is a simple optimization that fuses nearby critical sections provably protected by the same lock into one larger critical section, reducing the number of high-latency atomic instructions normally used to acquire locks. The resultant composite critical section may also capture code that previously resided between critical sections. (In addition to reducing atomic operations, lock coarsening admits additional code motion optimizations that would otherwise have been precluded because of the inability to optimize over lock boundaries.) Lock coarsening is a relatively simple local latency optimization. Unfortunately, if the lock is contended, then artificially increasing the critical section length—as will occur under lock coarsening—can impede scalability. In this case, in one or more embodiments, feedback from the synchronization 304 subsystem (when it detects lock contention) is used to advise the JIT compiler 320 to recompile the affected lock sites with lock coarsening disabled.

Recompiling the Inlined Lock Acquisition Path without Biased Locking Admission Code FIG. 3 shows recompiling an inlined lock acquisition path without biased locking 312 as part of the JIT compiler 320. Biased locking is motivated by the same concerns as lock coarsening—to reduce the cost of acquiring uncontended or unshared locks. Unfortunately, biased locking (and particularly the logic to conditionally bias a previously unbiased object) incurs path complexity and instruction "bloat" at emitted lock sites. Thus, if a lock site is highly contended, in one or more embodiments, it will be beneficial to recompile that site without the attendant logic to shift a lock from neutral into biased state. (Those paths would typically be never executed for contended locks.)

Hoisting Code Out of the Critical Section

FIG. 3 shows that code can be hoisted out of the critical section 314 as part of the JIT compiler 320. To the extent possible, the compiler applies compilation analysis resources to shift code out of the critical section, such as card-marking, safepoint polling points (which allow stop-the-world garbage collection), accesses to thread-private or final fields, and invocation of pure functions that appear at the end of the critical section. For example, in an embodiment of the system, suppose there exists the following Java™ critical section, where Angle and Theta are shared global variables and x is an auto or a thread-local variable:

```
synchronized (Lock) {
    Angle += Theta;
    x = cosine (Angle);
}
```

If the critical section were highly contended, the JIT compiler 320 might profitably apply additional analysis resources to the code and transform it into the equivalent code below, relocating the cosine( ) call, which could be a high-latency operation, outside the critical section body:

```
synchronized (Lock) {
    Angle += Theta;
    tmp = Angle;
}
x = cosine (tmp);
```

Care would need to be taken, of course, if the cosine( ) operator could throw exceptions. Such operations can often be safely shifted to either before or after the critical section.

Optimistically Shifting Computation Out of the Critical Section

The JIT compiler 320 might optimistically shift some computation out of the critical section and, instead, institute a strategy whereby it ratifies the inputs to the optimistically performed computation within the critical section. Note that this is an example of an optimization technique called value speculation. In classic value speculation, the code speculates that a value holds a certain value, possibly allowing it to avoid an expensive computation dependent on that value. In this case computation is shifted out of the critical region and speculate on whether or not the value was changed concurrently. FIG. 3 shows this optimization technique—optimistically shift computation out of critical section 316—as part of the JIT compiler 320. For example, in one embodiment of the system, assuming that x is a global shared variable, the JIT compiler 320 might transform the following:

```
synchronized (Lock) {
    double s = Math.Sqrt(x);
    ... use s ...
}
``` into code that is equivalent to the following:

```
double tmp = x;
double tmps = Math.Sqrt(tmp) ; // optimistically compute
synchronized (Lock) {
    // ratify x remains the same
    double s = (tmp == x) ? tmps : Math.sqrt(x);
    ... use s in some computation ...
}
```

Deferring Involuntary Preemption for Threads Executing in Critical Region

To reduce the odds of convoying, where the holder of a hot lock is preempted and other threads attempting entry languish behind that first thread, the system can recompile the lock acquisition path to use an operating system-provided interface in an embodiment of the system to request that the lock holder be less vulnerable to preemption while executing in the critical section. To the extent reasonable, the operating system kernel will defer involuntary preemption for threads executing in the critical section. This technique improves throughput by reducing unnecessary contention. FIG. 3 shows this optimization technique—defer involuntary preemption by OS in critical section 318—as part of the JIT compiler 320.

Note that in the discussion above there is no a firm distinction between the code, as a whole, within a critical section, and the hot frequently executed paths within a critical section. If the JIT compiler 320 is able to identify the latter, then it can specialize or customize its optimizations to just those hot code segments.

Thus far, this discussion has focused primarily on optimization techniques a JIT compiler may apply to optimize contended critical sections in a multi-threaded application. Since a virtual machine operates in a more general runtime environment, such as a Java™ runtime environment, more information is available to the JIT compiler from both the runtime environment and the virtual machine to perform additional optimizations. Moreover, the techniques presented can be generalized to include the virtual machine and runtime environment.

Figure 4:
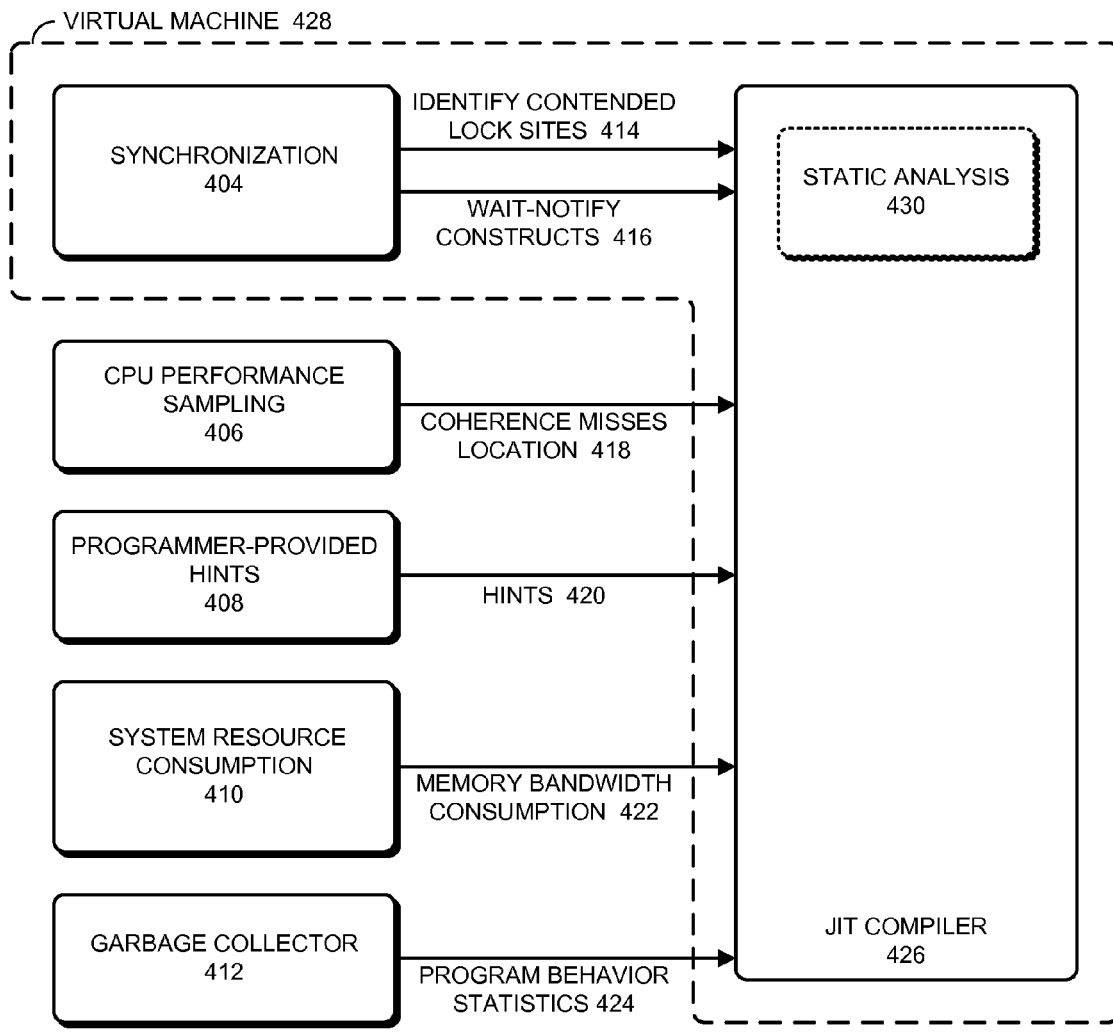
FIG. 4 shows the general model of a runtime environment in a computer system for Java™ applications in accordance with an embodiment.

FIG. 4 shows the general model of a runtime environment in a computer system for Java™ applications, both single-threaded and multi-threaded programs. Each Java™ application, as usual, executes in an instance of a virtual machine 428. Many instances of virtual machines are managed by the runtime environment. The runtime environment can be called a managed runtime environment 402 (MRTE 402). The Java™ runtime environment 104 of FIG. 1 is an example of this MRTE 402. This MRTE 402 provides directives or advisory information to a JIT compiler 426 in virtual machine 428 to cause the compiler to optimize emitted code, in accordance with an embodiment; such code, when executed, will increase the aggregate throughput of a multi-threaded application. Note that a Java™ virtual machine is one kind of virtual machine 428.

The system operates as follows in general. The MRTE 402 acquires a set of inputs and measurements and recommends compilation policies to the JIT compiler 426 in virtual machine 428. These inputs and measurements originate from the thread-aware approach and give the JIT compiler 426 the option of compiling the code differently, trading off compilation budget constraints or emitted code constraints to grant more of those resources to code that operates in contended critical sections. The compilation policies used in JITs today are thread-oblivious and do not account for execution in multi-threaded environments. Sampling and profiling—the standard inputs to the JIT compiler 426—and optimizing hot spots constitute a policy for single-threaded execution but not necessarily for collective progress under multi-threaded execution.

FIG. 4 further shows at least five different subsystems. The synchronization 404 subsystem is part of the virtual machine 428. The other four subsystems are part of the managed runtime environment 402. Note that the specific subsystems shown in the figure should not be construed as limiting the scope of the embodiments. In further embodiments other runtime interfaces to the JIT compiler 426 can be added to take advantage of different runtime information from the MRTE 402, and other subsystems may be added to the MRTE 402 or the virtual machine 428.

The synchronization 404 subsystem identifies contended lock sites 414 and communicates this information to the JIT compiler 426 via a new interface, as was shown in FIG. 3. Such interfaces could designate certain code regions as being particularly critical to aggregate throughput. Based on such feedback, the JIT compiler 426 may trigger reanalysis and recompilation of those designated regions.

The synchronization 404 subsystem may also build a waits-for graph or woke-by dependency graph and try to identify critical paths or circuits in the code. Such critical paths—as evidenced by hot edges in the dependency graph—might span threads. Using critical path analysis, or similar techniques, the virtual machine 428 could then identify the paths or segments within paths that most impede throughput and apply more aggressive code optimization techniques accordingly. The wait-notify constructs 416 and these thread dependency graphs are sent by the synchronization 404 subsystem to the JIT compiler 426.

The CPU performance sampling 406 subsystem from the MRTE 402 provides the coherence misses location 418 to the JIT compiler 426 via a new runtime interface. The programmer might even provide hints 420 to the JIT compiler 426 via another runtime interface from the programmer-provided hints 408 subsystem in the MRTE 402. Further, the system resource consumption 410 subsystem of the MRTE 402 can inform the JIT compiler 426 of resource bottlenecks like memory bandwidth consumption 422. The JIT compiler 426 itself can do a static analysis 430 of the multi-threaded program to identify sections of the code to be optimized.

Modern garbage-collected environments typically use "card-marking" to accelerate the scanning phase of garbage collections. In the card table implementation in a commercially available JVM™, for instance, all stores to reference fields within a 32 KB contiguous "card page" in the heap will result in stores to the same cache line in the card table. Almost all such stores are redundant (storing the same "dirty" flag over and over). For single-threaded performance, using a simple unconditional store into the card table is the right choice. But in multiprocessor environments, stores from different CPUs can incur significant rates of write invalidation and coherency traffic, so conditional card-marking, where the marking barrier code first loads the mark byte and conditionally skips the store if the card is already dirty (which is commonly the case) may be significantly more efficient than unconditional marking. The garbage collector 412 subsystem provides information such as the amount of memory traffic, configuration options, or number of threads created about conditional card-marking 424 to the JIT compiler 426.

While profiling, if the card-marking code appears "hot" too often, or if coherence traffic on the card table is excessively high—possibly measured via hardware-based instruction sampling or CPU-level performance counters—the JIT compiler 426 could recompile unconditional marking sites to instead use conditional marking.

In addition to reducing coherence traffic, conditional card-marking greatly aids Transactional Lock Elision (TLE) by avoiding false positive hardware transaction failures—similar to false sharing—for concurrent transactions that store into a common card table cache line.

Conditional card-marking is a specific instance of redundant store elimination. In fact, the optimization strategy for card-marking could be applied to provide generalized redundant store elimination.

The example of conditional card-marking best illustrates the key point that in the "optimize for throughput" case, the system can use optimizations that may improve throughput, even though they may make the code worse according to measures ordinarily used to optimize single-threaded code. Conditional card-marking is a clear example because it is not just magnitude of the optimization, but rather "polarity" in that the multiprocessor-friendly form is actually slower for single-threaded execution. Put another way, the multiprocessor-friendly optimization is not just applying more of the usual optimizations, but rather a fundamentally different thread-aware optimization. And, in fact, that optimization has a negative impact for simple single-threaded execution.

Figure 5:
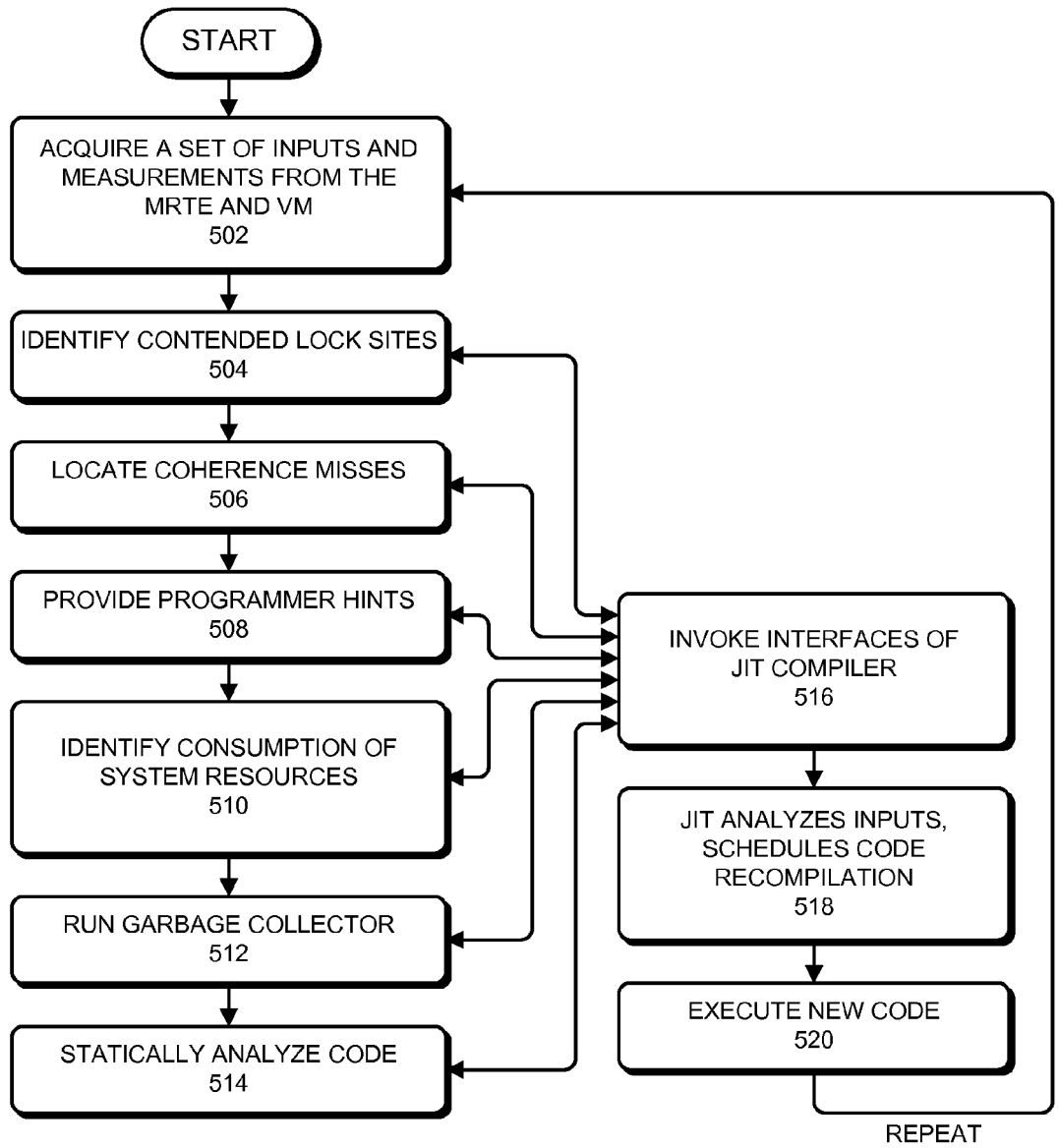
FIG. 5 shows a flowchart illustrating the process of a just-in-time compiler's acquisition of a set of inputs and measurements from a runtime environment and virtual machine and emitting optimized code for execution, in accordance with an embodiment.

FIG. 5 shows a flowchart illustrating the general procedure of a managed runtime environment or virtual machine providing directives or advisory information to a JIT compiler on behalf of an executing multi-threaded application to increase aggregate throughput of that multi-threaded application. In one or more embodiments, one or more of the steps may be omitted, repeated, or performed in a different order, or new steps may be added, or any combination of the preceding. Note that the specific arrangement of steps shown in the figure should not be construed as limiting the scope of the embodiments.

First, a JIT compiler 426 of FIG. 4, which is executing a multi-threaded application, acquires a set of inputs and measurements from the managed runtime environment 402 and the virtual machine 428 of FIG. 4 (operation 502). The synchronization subsystem of the virtual machine identifies contended locks in the executing application and reports the lock sites to the JIT compiler by invoking a new runtime interface to the JIT compiler (operation 504). The double arrow between the identity of contended lock sites and invoking an interface of the JIT compiler indicates a procedure call, in one embodiment, that returns to the caller. The CPU performance sampling infrastructure can locate coherence misses and supply this information to the JIT compiler via a new, runtime interface (operation 506). As before, the double arrow indicates a procedure call in one embodiment. The programmer may also provide hints to the JIT compiler via advisory directives or a new runtime interface (operation 508), in one embodiment. Additionally, the operating system can monitor which resources are consumption bottlenecks in the multi-threaded application and can invoke a new, runtime interface to the JIT compiler to inform it, for example, of excessive memory bandwidth consumption (operation 510). Also, the garbage collector may use conditional card-marking to optimize for the throughput case (operation 512), in some embodiments. Additionally, the JIT compiler itself can derive information about the application through static analysis (operation 514), in one embodiment. The JIT compiler can also analyze the inputs from the previous steps and schedule code to be recompiled accordingly (operation 518), in some embodiments. Finally, the new code generated is executed by the virtual machine (operation 520).

These techniques may be repeated periodically to monitor the performance and to increase the aggregate throughput of a multi-threaded application.

While the techniques described in one or more embodiments are motivated by simple mutual exclusion locks, the techniques are applicable to other synchronization primitives such as condition variables, semaphores, park-unpark operators, fork join frameworks, concurrent reentrant locks, read-write locks, event counters and sequencers, transactional memory, transactional lock elision, and even simple synchronization idioms based on communication through shared memory. In general, any communication protocol—in which one thread waits for another and the task dependencies can be identified—is amenable to the optimization strategy.

Furthermore, various aspects of the approach are also applicable to optimistic synchronization techniques, in one or more embodiments. For example, if the JIT compiler 320 of FIG. 3 recognizes an LD . . . CAS idiom, it could intentionally optimize the most frequently taken path between the LD and the CAS.

While motivated and described in terms of JIT compilers and dynamic compilation, the above techniques are broadly applicable to static compilation as well, particularly those that permit feedback-directed optimization. Under feedback-directed optimizations, profiling information is collected at runtime and used to tailor the optimization decisions that are made. Previous work has shown that feedback-directed optimizations substantially improve program performance, but most of these systems use off-line profiles collected using a separate training run. The overhead of collecting these on-line profiles is problematic; this is one principal reason why today's JVM™s perform only limited forms of feedback-directed optimizations.

Even in the absence of feedback-directed optimization the techniques described in one or more embodiments, can be used in statically compiled applications, for example by having the compiler emit alternative code that is optimized for throughput, with one or more optimized for single-threaded performance and one or more optimized for throughput, and using monitoring and measurements to drive decisions about which code path to use.

The definition of resource contention can be broadened to cover more than the typical lock-based critical section. For example, suppose there exists a concurrent queue into which threads insert request messages. One or more server threads may extract those messages from the queue, perform some operation, and then reply to the sender, indicating the operation is complete. Such a queue and the path executed by the server threads are considered a contended resource. One can also think of it as a kind of concurrent "choke point" or funnel. By speeding up the server paths, even though they might not appear classically "hot" to a traditional profiling JIT (as measured by simple invocations/sec), the throughput of the system can still be improved.

The foregoing descriptions of embodiments have been presented for purposes of illustration and description only. They are not intended to be exhaustive or to limit the present description to the forms disclosed. Accordingly, many modifications and variations will be apparent to practitioners skilled in the art. Additionally, the above disclosure is not intended to limit the present description. The scope of the present description is defined by the appended claims.

What is claimed is:

1. A method for optimizing code for a multi-threaded application, comprising:
   obtaining information associated with resource contention between executing threads, wherein said obtaining comprises acquiring information obtained by statically analyzing the code, sampling CPU performance while executing the code for the multi-threaded application, acquiring program behavior statistics while executing the code for the multi-threaded application, and acquiring information about consumption of one or more system resources while executing the code for the multi-threaded application;
   analyzing the information associated with resource contention to identify critical sections of the code that are protected by a lock, wherein the critical sections of the code read, write, or both read and write shared data in the multi-threaded application, and wherein said analyzing comprises building a waits-for graph or a woke-by dependency graph;
   using a compiler to recompile the critical sections of the code to produce optimized critical section code, wherein locking code is outside the critical sections of the code; and
   storing the optimized critical section code for subsequent execution.

2. The method of claim 1, wherein obtaining the information associated with the resource contention further comprises:
   acquiring programmer-provided hints.

3. The method of claim 1, wherein producing the optimized code further comprises one or more of the following:
   inlining one or more paths within at least one of the critical sections;
   de-coarsening at least one of the critical sections;
   recompiling an inline lock acquisition path without biased locking admission code;
   hoisting code out of at least one of the critical sections;
   optimistically shifting computation out of at least one of the critical sections; and
   deferring involuntary preemption for threads executing in at least one of the critical sections.

4. The method of claim 1, wherein using the compiler further comprises:
receiving the acquired resource contention information; and
sending the acquired resource contention information to the compiler through one or more interfaces.

5. The method of claim 4, wherein the one or more interfaces for the compiler are extended to permit subsystems in the runtime environment to recommend compilation policies to the compiler.

6. The method of claim 1, wherein the compiler is a just-in-time compiler that compiles byte codes into native machine code on-the-fly.

7. A non-transitory computer-readable storage medium for storing instructions that, when executed by a computer causes the computer to perform a method for optimizing code for a multi-threaded application, the method comprising:
obtaining information associated with resource contention between executing threads, wherein said obtaining comprises acquiring information obtained by statically analyzing the code, sampling CPU performance while executing the code for the multi-threaded application, acquiring program behavior statistics while executing the code for the multi-threaded application, and acquiring information about consumption of one or more system resources while executing the code for the multi-threaded application;
analyzing the information associated with resource contention to identify critical sections of the code that are protected by a lock, wherein the critical sections of the code read, write, or both read and write shared data in the multi-threaded application, and wherein said analyzing comprises building a waits-for graph or a woke-by dependency graph;
using a compiler to recompile the critical sections of the code to produce optimized critical section code, wherein locking code is outside the critical sections of the code; and
storing the optimized critical section code for subsequent execution.

8. The non-transitory computer-readable storage medium of claim 7, wherein obtaining the information associated with the resource contention further comprises:
acquiring programmer-provided hints.

9. The non-transitory computer-readable storage medium of claim 7, wherein producing the optimized code further comprises one or more of the following:
inlining one or more paths within at least one of the critical section;
de-coarsening at least one of the critical section;
recompiling an inline lock acquisition path without biased locking admission code;
hoisting code out of at least one of the critical section;
optimistically shifting computation out of at least one of the critical section; and
deferring involuntary preemption for threads executing in at least one of the critical section.

10. The non-transitory computer-readable storage medium of claim 7, wherein using the compiler further comprises:
receiving the acquired resource contention information; and
sending the acquired resource contention information to the compiler through one or more interfaces.

11. The non-transitory computer-readable storage medium of claim 10, wherein the one or more interfaces for the compiler are extended to permit subsystems in the runtime environment to recommend compilation policies to the compiler.

12. The non-transitory computer-readable storage medium of claim 7, wherein the compiler is a just-in-time compiler, which compiles byte codes into native machine code on the fly.

13. A computer system that optimizes code for a multi-threaded application, comprising:
a processor;
a memory;
wherein the computer system is configured to,
obtain information associated with resource contention between executing threads, wherein said obtaining comprises acquiring information obtained by statically analyzing the code, sampling CPU performance while executing the code for the multi-threaded application, acquiring program behavior statistics while executing the code for the multi-threaded application, and acquiring information about consumption of one or more system resources while executing the code for the multi-threaded application, and
analyze the information associated with resource contention to identify critical sections of the code that are protected by a lock, wherein the critical sections of the code read, write, or both read and write shared data in the multi-threaded application, and wherein said analyzing comprises building a waits-for graph or a woke-by dependency graph; and
a compiler configured to recompile the critical sections of the code to produce optimized critical section code, wherein locking code is outside the critical sections of the code, and to store the optimized critical section code for subsequent execution.

* * * * *

UNITED STATES PATENT AND TRADEMARK OFFICE
CERTIFICATE OF CORRECTION

| | | |
|---|---|---|
| PATENT NO. | : 8,826,249 B2 | Page 1 of 1 |
| APPLICATION NO. | : 12/708014 | |
| DATED | : September 2, 2014 | |
| INVENTOR(S) | : Dice et al. | |

It is certified that error appears in the above-identified patent and that said Letters Patent is hereby corrected as shown below:

In the Specification

In column 7, lines 3-7, delete "Machine in.............application." and insert the same on Col. 7, Line 2, after "Virtual" as the continuation of the same paragraph.

Signed and Sealed this
Twenty-fourth Day of March, 2015

Michelle K. Lee
*Director of the United States Patent and Trademark Office*